United States Patent
Itabashi et al.

(10) Patent No.: US 6,850,047 B2
(45) Date of Patent: Feb. 1, 2005

(54) SWITCHING REGULATOR AND POWER SUPPLY USING THE SAME

(75) Inventors: Toru Itabashi, Anjo (JP); Takanori Ishikawa, Aichi-ken (JP); Junichi Nagata, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/694,294

(22) Filed: Oct. 28, 2003

(65) Prior Publication Data

US 2004/0085052 A1 May 6, 2004

(30) Foreign Application Priority Data

Oct. 30, 2002 (JP) .................................... 2002-316366
Sep. 19, 2003 (JP) .................................... 2003-328350

(51) Int. Cl.[7] .............................................. G05F 1/40
(52) U.S. Cl. ..................... 323/284; 323/288; 323/901; 323/908; 363/49
(58) Field of Search ................................ 323/282, 284, 323/285, 288, 901, 908; 363/49, 80, 81, 89

(56) References Cited

U.S. PATENT DOCUMENTS 6,674,272 B2 * 1/2004 Hwang ....................... 323/284

FOREIGN PATENT DOCUMENTS

| JP | 6-250747 | 9/1994 |
| JP | 6-335238 | 12/1994 |
| JP | 9-37545 | 2/1997 |
| JP | 9-285110 | 10/1997 |
| JP | 10-23749 | 1/1998 |
| JP | 10-56776 | 2/1998 |
| JP | 10-215568 | 8/1998 |

* cited by examiner

Primary Examiner—Gary L. Laxton
(74) Attorney, Agent, or Firm—Posz & Bethards, PLC

(57) ABSTRACT

The power supply PS includes a voltage detecting circuit VD for detecting a voltage level Vs inputted from an external voltage source, a boot strap circuit BS, andET connected in parallel with BS, a smoothing circuit SM connected with the BS output terminal and a regulating IC connected with BS and FET. The regulating IC includes VD, a transistor Tr and condenser C. Both when a PS switch is turned on and when VD detects that Vs (which once descended) reaches an ascending reference, a high level driving signal generated by VD is changed into a low level signal, thereby turning off Tr connected with C. Thus, until Tr completes charging up C, a duty ratio of a pulse width modulation (PWM) signal dependent on the SM output is made gradually greater, thereby surely preventing a rush current by turning on and off the FET by the PWM signal.

13 Claims, 8 Drawing Sheets

SWITCHING REGULATOR AND POWER SUPPLY USING THE SAME

BACKGROUND OF THE INVENTION

1. Field of the Invention

The present invention relates to a switching regulator and power supply using the same.

2. Description of the Related Art

One of the conventional switching regulator or series regulator for use in supplying a stabilized constant voltage by lowering a voltage inputted from an external voltage source is disclosed in, e.g., JP9-37545A, 1997, paragraphs 0002 to 0004, FIGS. 2 and 3.

In the conventional switching regulator, the stabilized constant voltage is obtained by switching on and off a transistor connected in series with a current route from the external voltage source, thereby supplying a smoothing circuit with a required electric power only. Therefore, a loss of the electric power is smaller, although an accuracy in the outputted voltage is lower.

On the other hand, in the conventional series regulator, the stabilized constant voltage is obtained by increasing and decreasing a driving power of a transistor connected in series with the current route, thereby minutely controlling a voltage between terminals of that transistor. Therefore, although the loss of the electric power is greater, the accuracy in the outputted voltage is higher. This is because the electric power is unnecessarily consumed by the above-mentioned transistor.

Therefore, there is disclosed in JP6-335238A, 1994, paragraphs 0002 to 0005, FIG. 3, an improved power supply comprising both the switching regulator and series regulator which are connected in series with the current route. Here, the switching regulator lowers, under a smaller power loss, a voltage from the external voltage source of which voltage is higher than a prescribed voltage, down to an intermediate voltage slightly above that prescribed voltage, while the series regulator lowers the intermediate voltage precisely onto the prescribed voltage. Thus, the electric power is not excessively consumed by the series regulator and moreover the accuracy in the outputted voltage becomes higher.

FIG. 7 is a circuit diagram of an example of the above-mentioned power supply comprising both the switching regulator and series regulator.

The power supply 101 as shown in FIG. 7 comprises: an input filter 2 (low pass filter) comprising a coil L1 and condenser C1 for removing a high frequency noise superposed through the current route from the external voltage source; a switching regulator 60 for generating the intermediate voltage $V_3$ by lowering a voltage $V_1$ inputted from the external voltage source through the input filter 2; and a series regulator 40 for lowering $V_3$ in order to generate the prescribed voltage $V_4$ which is an output from the power supply 101.

The switching regulator 60 comprises: a MOS-FET 4 inserted into the current route; a smoothing circuit 5 for smoothing the output from FET 4; a regulating IC 61 for turning on and off FET 4 in order to keep constant the output V3 from FET 4.

The series regulator 40 comprises: a resistance R2 for detecting an electric current $I_1$ flowing through the switching regulator 60 into the series regulator 40; a bipolar transistor 7 connected with the R2 and inserted into the current route; and a regulating IC 41 for controlling a base current of the transistor 7, detecting V3 and, an electric current $I_2$ flowing into the transistor 7 and turning off the transistor 7 if $V_1$ and $I_2$ are excessive.

Further, the smoothing circuit 5 in the switching regulator 60 comprises: a low pass filter comprising a coil L2 and condenser C2; and a flywheel diode D2 for emitting an electromagnetic energy stored during turning-on of FET 4, by turning itself on during turning-off of FET 4.

Further, the regulating IC 61 comprises: a voltage dividing circuit 32 for dividing $V_3$; a comparison signal generating circuit 33 for generating a comparison signal as stated later; a pulse width modulation (PWM) signal circuit 34 for generating a PWM signal of which duty ratio (an on-time:a period) is dependent upon a level of that comparison signal; and a soft start circuit 37 for having the PWM circuit 34 generate a PWM signal of which duty ration is suppressed.

The regulating IC 61 further comprises: a charge pump 35 which takes in an electric power from a current route between the input filter 2 and FET 4 every prescribed time interval and steps up the high level voltage of the PWM signal (amplitude of the PWM signal) up to a voltage which can keeps FET 4 turned on (voltage greater than a threshold voltage of FET 4 plus a source voltage when FET 4 is turned on); a pre-driving circuit 36 steps up the PWM signal amplitude and supply the gate of FET 4 with an output voltage $V_2$.

Here, the charge pump 35 stores the electric power taken in from the curent route into a plurality of condensers connected in series with each other, thereby supplying the pre-driving circuit 36 with the stepped-up voltage.

Further, the comparison signal generating circuit 33 comprises: a voltage generating circuit 331 for generating a reference voltage Vref if $V_1$ is greater than a prescribed voltage, e.g., 4.5 V; and an operational amplifier 333 for amplifying a difference between a divided voltage from the voltage dividing circuit 32 and Vref from the voltage generating circuit 331, thereby generating the comparison signal.

Here, the level of the above-mentioned comparison signal is made positive if the divided voltage is greater than Vref, is made negative if the divided voltage is smaller than Vref and is made zero if the divided voltage is equal to Vref.

Further, the PWM circuit 34 comprises: a reference wave generating circuit 341 for generating a triangular wave vibrating to the positive and negative directions around 0 V; an operational amplifier 342 for generating the above-mentioned PWM signal by comparing the triangular wave and the above-mentioned comparison signal. Here, the operational amplifier 342 generates the PWM signal of which duty ratio becomes greater as the divided voltage becomes smaller compared with Vref.

Further, the soft start circuit 37 is a condenser C3 of which one end is connected with the inverting input terminal of the operational amplifier 333 and of which another end is grounded. Further, a resistance R3 is inserted between the output terminal of the voltage generation circuit 331 and the inverting input terminal of the operational amplifier 333.

Thus, when the power supply 101 is started and voltage generating circuit 331 generates Vref, C3 is charged up through R3, thereby gradually increasing the voltage level inputted into the inverting terminal of the operational amplifier 333, whereby that voltage level finally reaches a prescribed Vref.

Therefore, the soft start circuit 37 prevents a rush current from flowing into the transistor 7 under a transient state. As regards the soft start circuit, it is disclosed in, e.g., JP6-250747A, 1994, paragraphs 0016 to 0017, FIG. 1.

In general, the rush current is generated, when a sudden voltage change is caused when starting up the power supply, by a delayed and excessive control when a feed-back system for generating the PWM signal cannot follow that sudden voltage change. However, the rush current may possibly be caused, even when the power supply 101 is once stabilized after completing the operation of the soft start circuit 37, i.e., even when $V_1$ or $V_3$ is lowered for a short time period due to some cause and afterward it returns back to its original value, as shown in FIG. 8.

However, the conventional soft start circuit 37 has a disadvantage that it cannot completely exhibit the soft start function against the above-mentioned short-time-period voltage drop, because the conventional soft start circuit 37 may fail to discharge rapidly enough all the stored charges during the above-mentioned short time period. Therefore, the conventional switching regulator and power supply using the same has a disadvantage that it may possibly allow the rush current in $I_1$ to flow, as shown in FIG. 8.

SUMMARY OF THE INVENTION

An object of the present invention is to provide a switching regulator and power supply using the same which can softly start, i.e., prevent a rush current from flowing into them, always when necessary.

In the switching regulator of the present invention, an output from the switching means inserted into a current route between an external voltage source and electric load is smoothed by the smoothing means of which output is kept constant by using a pulse width modulation (PWM) signal.

When, after the switching regulator was turned on, a voltage at a prescribed point on the current route ascends and crosses over an ascending reference which is lower than a stabilized voltage of the prescribed point voltage, the rush current preventing means for preventing a rush current on said current route by suppressing a duty of the PWM signal within a prescribed duty during a prescribed time period. Here, the stabilized voltage is the stabilized prescribed point voltage when the external voltage source supplies the switching regulator with a stabilized voltage.

Further, the recovering means for operating again the rush current preventing means even after once completing its operation, if the prescribed point voltage descends and crosses down a prescribed descending reference which is fixed lower than the prescribed ascending reference.

Thus, the switching regulator of the present invention prevents the rush current from flowing into the current route, not only when the switching regulator is turned on, but also when the prescribed point voltage was once stabilized and afterward descends and crosses down a prescribed descending reference.

The control signal generating means for generating the PWM signal may includes: reference voltage generating means for generating a prescribed reference voltage if the prescribed point voltage is higher than the ascending reference; and comparison signal generating means for generating a comparison signal of which amplitude is proportional to a difference between the prescribed reference voltage and a fraction of a smoothed voltage outputted from the smoothing means.

In this case, the rush current preventing means, in order to prevent a rush current from flowing in the current route, for generating a suppress control signal for suppressing a duty of the PWM signal by allowing the comparison signal generating means to generate a comparison signal of which signal level is changed in such a manner that the duty of the PWM signal increases with the lapse of time.

Concretely, the rush current preventing means may be a condenser which is charged from a discharged voltage up to the prescribed reference voltage during the prescribed time period and which supplies, in place of the prescribed reference voltage, the comparison signal generating means with a voltage of the condenser during being charged.

In this case, the recovering means can operate again the rush current preventing means merely by discharging the condenser.

Therefore, the switching regulator of the present invention can be manufactured easily and cheaply, because the rush current preventing means and recovering means are simple analog circuits.

Further, the rush current preventing means may comprise: pulse generating means for generating a pulse train during the prescribed time period; and suppress control signal generating means for generating the suppress control signal on the basis of the pulse train. The recovering means operates again the rush current preventing means by resetting the pulse generating means.

In this case, the suppress control signal generating means may include off-driving means for changing a signal level of the PWM signal into a level which turns off the switching means. The suppress control signal generating means, on the basis of the operation of the off-driving means, generates the suppress control signal in which a component of a level which turns on the switching means is suppressed.

Concretely, the pulse generating means may be a flip-flop circuit or counter circuit. Further, the off-driving circuit may be a transistor which supplies, on the signal line of the PWM signal, a signal of which level turns off the switching means or it may be a logical product (AND) circuit of which input are the pulse train and PWM signal.

Therefore, the switching regulator of the present invention can be manufactured easily and cheaply and suitable for an IC circuit, because the rush current preventing means and recovering means are simple digital circuits.

As for the prescribed point voltage, the recovering means detects may detect the prescribed point voltage through a low pass filter connected with the external voltage source.

In this case, the low pass filter removes a spike noise superposed on the prescribed point voltage, thereby preventing unnecessarily operating the recovering means due to an instant voltage drop due to the spike noise, i.e., preventing the rush current preventing means from operating at an unnecessary timing.

Although the prescribed point voltage can be taken in from anywhere, it may be a voltage outputted from said external voltage source, voltage outputted from the smoothing means or voltage outputted from other regulator connected between the switching regulator and electric load.

Particularly, the voltage outputted from the smoothing means or the other regulator is advantageous for the prewscribed point voltage, because the soft start is not unnecessarily executed. This is because a voltage drop may not possibly be caused if the power consumption in the electric load is small even when a voltage drop is caused in a source of an electric power, under an assumption that the power consumption in the electric load is small.

Further, all the means of the switching regulator may be contained in a one-chip semiconductor circuitis according to claim 1, excepting first determining means for determining said prescribed time period, second determining means for determining said ascending reference and third determining means for determining said descending reference. By excluding the switching means which dissipates a large quantity of heat, any measure for the heat resistance is not required, thereby cheaply manufacturing the semiconductor IC circuit. Further, by excluding the determining means, the values to be determined are easily changed.

Further, a power source apparatus for supplying an electrical load with a constant voltage may be constructed by the above-explained switching regulator of the present invention together with one or more secondary regulators connected between the switching regulator and electric load.

Particularly, if a series regulator is employed as the secondary regulator, an output with high voltage accuracy is obtained with a small power loss from the series regulator, whereby the power source apparatus becomes of high voltage accuracy and low power consumption.

In this case, the descending reference is fixed higher than a voltage at which either of the switching regulator, or secondary regulators is tuned off.

The descending reference thus fixed allows the rush current preventing means to surely operate again, when either of the switching regulator, or secondary regulators is tuned off.

The power supply apparatus of the present invention is particularly suitable for various electronic control apparatuses mounted on a vehicle, because a battery voltage (voltage outputted from the external voltage source) often drops greatly and may frequently drop due to other causes.

PREFERRED EMBODIMENT OF THE INVENTION

Figure 1:
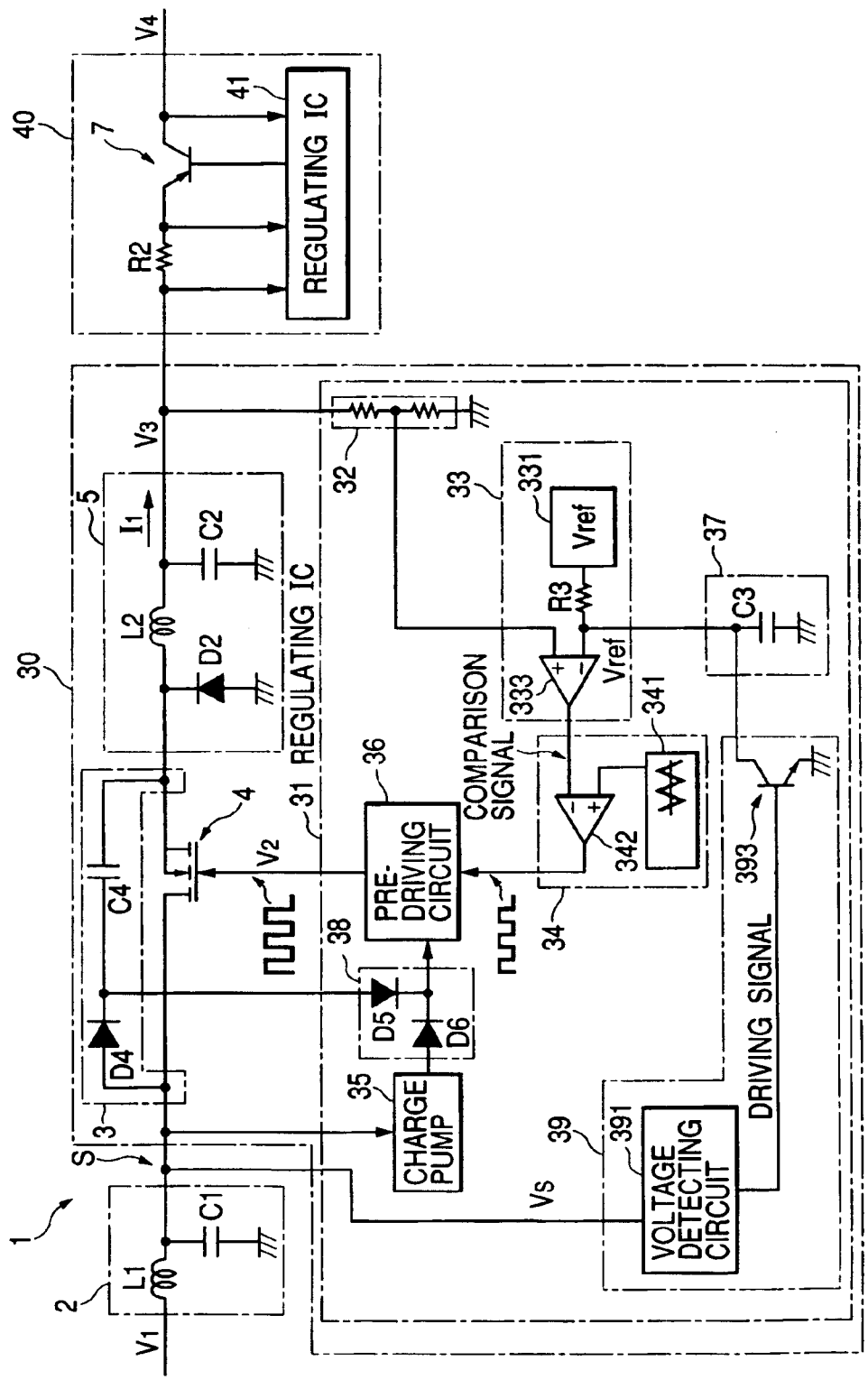
FIG. 1 is a circuit diagram of the power supply of Embodiment 1 of the present invention.

Preferred embodiments of the present invention is explained, referring to the drawings.

Embodiment 1

Figure 7:
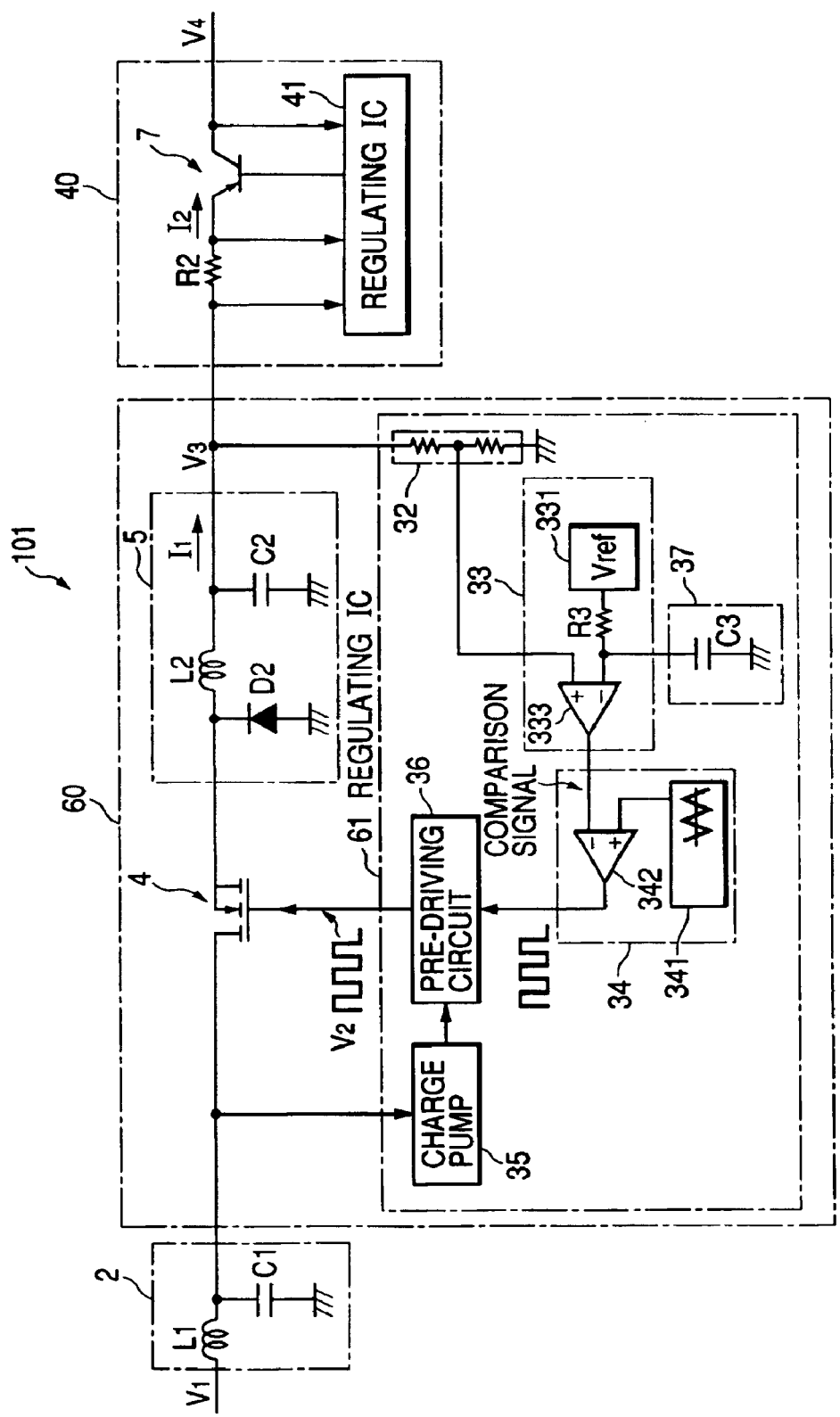
FIG. 7 is a circuit diagram of one of the conventional power supplies.
Figure 8:
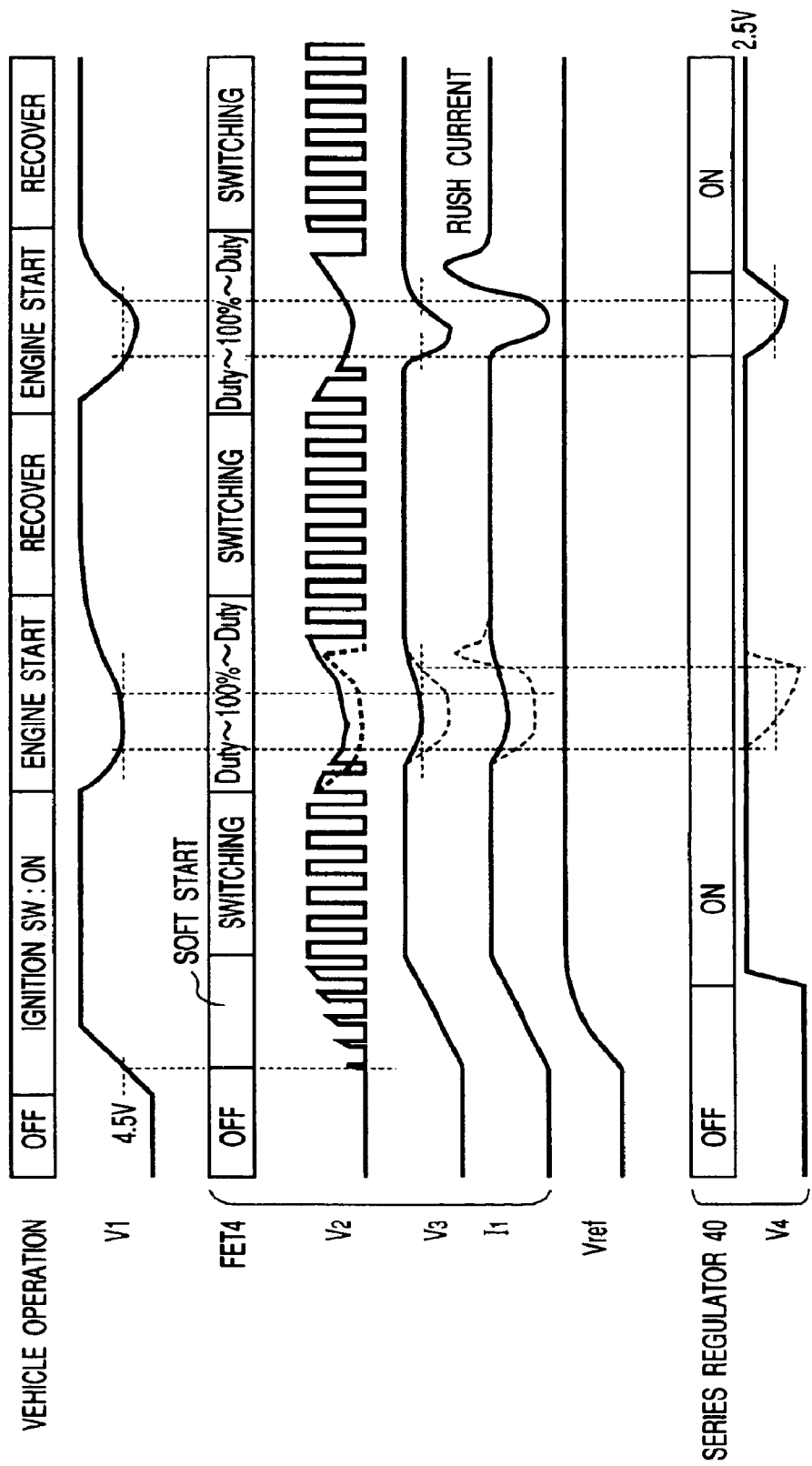
FIG. 8 is a timing chart of voltages and an electric current at various points in the conventional power supply circuit as shown in FIG. 7.

FIG. 1 is a circuit diagram of the power supply 1 of Embodiment 1 of the present invention. The similar reference numerals are given to the similar elements as those in the conventional power supply 101 as shown in FIG. 7.

Figure 2:
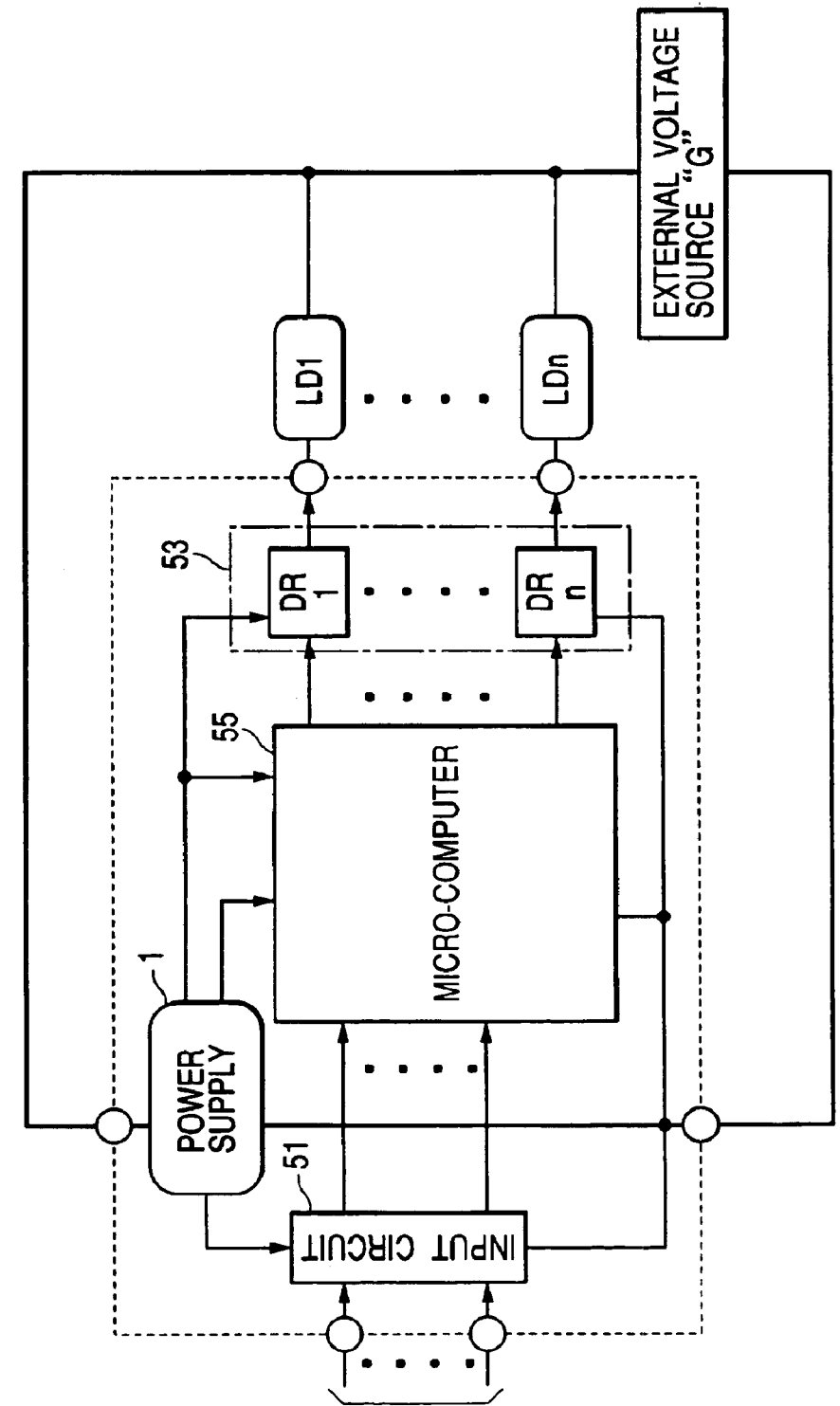
FIG. 2 is a block diagram of a vehicle control apparatus including the power supply of Embodiment 1.

FIG. 2 is a block diagram of a vehicle control apparatus 50 including the power supply 1 as shown in FIG. 1. The vehicle control apparatus as shown in FIG. 2 comprises: an input circuit 51 including a filter and analog-to-digital (A/D) converter for receiving signals from sensors disposed outside the vehicle control apparatus 50 and other signals; driving circuits 53 ($DR_1$ to DRn) which is supplied by an external voltage source G and drives electrical loads $LD_1$ to LDn; a micro-computer 55 which executes various calculations on the basis of the signals inputted from the input circuit 51 in order to obtain instructions for the driving circuits 53; and the power supply 1 for supplying the elements 51 to 55 with prescribed voltages.

Here, the external voltage from the external voltage source G is high, e.g., 12 V in Embodiment 1, and relatively fluctuates greatly. Therefore, the power supply 1 of the present invention is used in order to lower the above-mentioned external voltage, thereby obtaining a stabilized constant voltage, e.g., 2.5 V.

Although the switching regulator 30 as shown in FIG. 1 comprises the conventional FET 4 and conventional smoothing circuit 5, it further comprises: a regulating IC 31 partly different from the conventional one and a boot strap circuit 3 for generating, when FET 4 is turned on, a boot voltage higher than an input voltage V1.

The boot strap circuit 3 (a series connection of a diode D4 and condenser C4) is connected in parallel with the FET 4. The boot voltage is taken out from the connecting point of the diode D4 and condenser C4. Further, the anode of the diode D4 is connected with the drain of FET 4, while its cathode is connected with one end of the condenser C4. The other end of the condenser C4 is connected with the source of FET 4.

When FET 4 is turned off, its source potential becomes almost the earth potential, thereby charging the condenser C4 up to the input voltage $V_1$. Afterward, when the FET 4 is turned on, the source voltage becomes almost $V_1$, thereby generating the boot voltage which is the source voltage of the FET 4 plus the charged voltage of C4.

Further, although the regulating IC 31 comprises: the conventional voltage dividing circuit 32; conventional comparison signal generating circuit 33; conventional PWM circuit 34; conventional charge pump 35; conventional pre-driving circuit 36; and conventional soft start circuit 37, it further comprises: a supply voltage selecting circuit 38 for supplying the pre-driving circuit 36 with a greater voltage from among either of the boot voltage from the boot strap circuit 3 or the charge pump voltage outputted from the charge pump 35; and a function recovery circuit 39 for operating again the soft start circuit 37 which is being stopped after operating when the power supply 1 is started up.

The pre-driving circuit 36 does not only step up the PWM signal amplitude, but also fixes the duty ratio of the stepped-up PWM signal ($V_2$) to be 100% if the duty ratio of the PWM signal becomes greater than a reference ratio, e.g., 95% in Embodiment 1.

Further, the supply voltage selecting circuit 38 comprises: a diode D5 wherein the boot voltage is applied to its anode; and a diode D6 wherein the charge pump voltage is applied to its anode. The cathodes of D5 and D6 are connected with each other and are connected with the pre-driving circuit 36.

Here, the boot voltage becomes 2V1 when the FET 4 is turned on and afterward becomes lowered gradually. Therefore, the boot voltage becomes greater than the charge pump voltage. On the other hand, if the FET 4 is fixed to be always on, the boot voltage is nearly equal to $V_1$, whereby the charge pump voltage is greater than the boot voltage.

Therefore, the pre-driving circuit 36 is supplied, through the supply voltage selecting circuit 38, with the boot voltage when the FET 4 is turned on and off, or is supplied with the charge pump voltage when the FET 4 is always on.

The function recovering circuit 39 comprises: a voltage detecting circuit 391 for generating a driving signal as states later on the basis of a voltage Vs at the output terminal of the input filter 2; and a transistor 393 for discharging C3 of the soft start circuit 37.

The voltage detecting circuit 391 determines whether or not Vs ascended and crossed over an ascending reference, e.g., 4.5 in Embodiment 1 and moreover whether or not Vs descended and crossed down a descending reference lower than the ascending reference. Here, the descending reference is fixed greater than $V_3$ (e.g., 3.0 V in Embodiment 1) inputted into the series regulator 40. Here, the specific value of the output $V_4$ (e.g., 2.5 V in Embodiment 1) which should be outputted from the series regulator 40 is assured by the input $V_3$.

Figure 3:
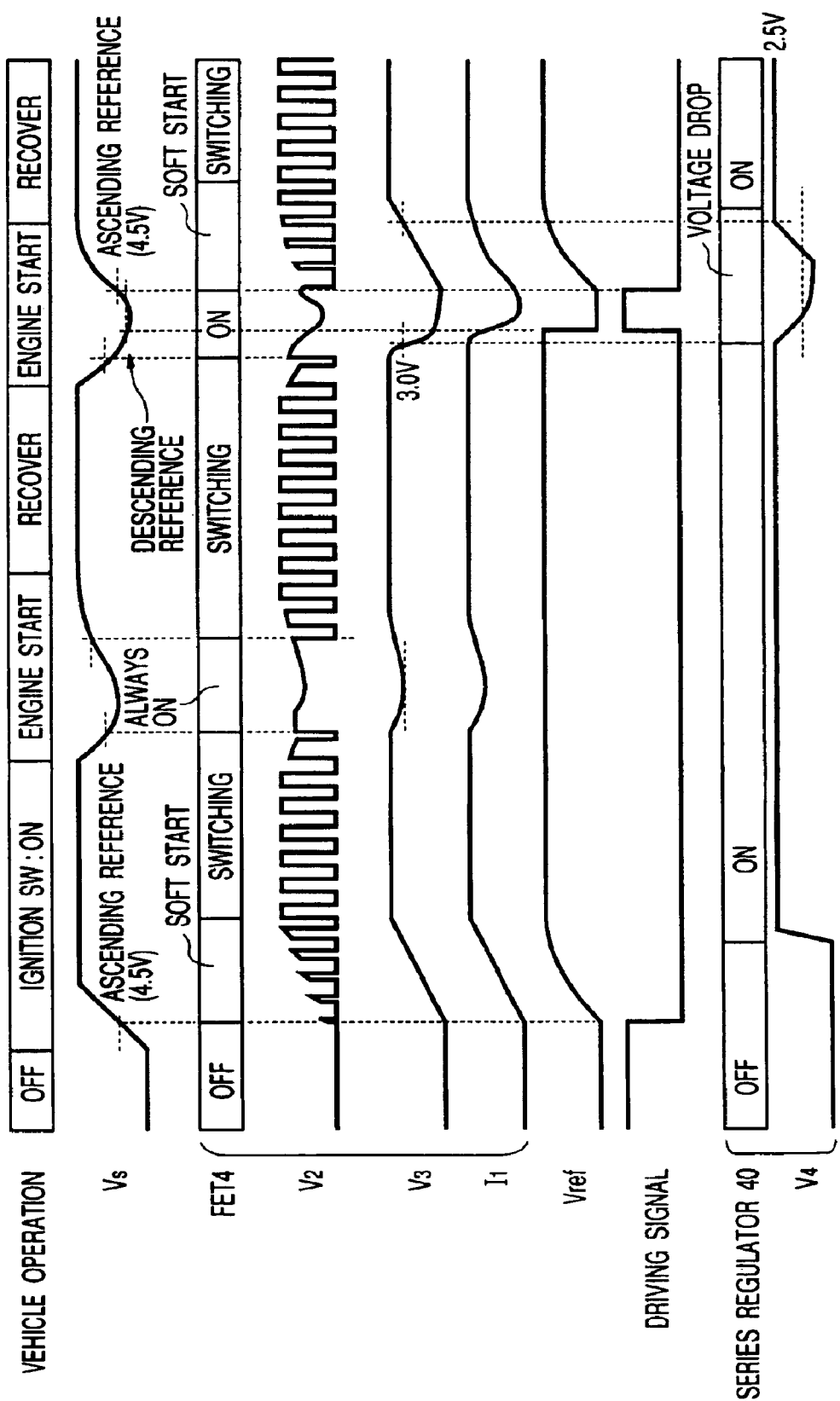
FIG. 3 is a timing chart of voltages and an electric current at various points in the power supply circuit of Embodiment 1.

Further, the driving signal level generated by the voltage detecting circuit 391 is made high, not only during a period from the start-up of the power supply 1 to the cross-over of the ascending reference, but also during another period from the cross-down of the descending reference to the recovery of the ascending reference, as shown in FIG. 3.

Thus, the transistor 393 is turned on and discharges C3, when the above-mentioned driving signal level is made high.

Therefore, as shown in FIG. 3, not only when the ignition switch SW of the vehicle is turned on and the power supply 1 is electrically connected with the external power supply G (as shown in FIG. 2), but also when the voltage detecting circuit 391 detects that Vs reaches the ascending reference, the high level driving signal is changed into a low level driving signal by the voltage detecting circuit 391, thereby turning off the transistor 393. Then, charging the condenser C3 is started. Until completing charging C3, the duty ratio of the PWM signal is made gradually greater, in other words, the duty ratio is suppressed, thereby executing the soft start of the power supply 1 by turning on and off the FET 4.

Then, after a prescribed time period during which the duty ratio is suppressed, the voltage of the condenser C3 (inputted into the inverting terminal of the operational amplifier 333) reaches Vref. Then, the FET 4 starts constantly turning on and off.

Then, afterward, if Vs is lowered due to an engine start or other causes, the PWM circuit 34 supply the pre-driving circuit 36 with the PWM signal having a greater duty ratio, thereby keeping $V_3$ at a constant voltage. If the duty ratio becomes greater than a reference duty ratio, the pre-driving circuit 36 fixes the duty ratio of its output $V_2$ to be 100%, thereby always turning on the FET 4.

At this time, if Vs does not cross down the descending reference, Vs ascends. Then, when the duty ratio becomes smaller than the reference duty ratio, the pre-driving circuit 36 relieves the FET 4 from the always-on state, as shown in FIG. 3: the first engine start.

On the other hand, if Vs crosses down the descending reference, the voltage detecting circuit 391 generates an high level driving signal, thereby turning on the transistor 393 and discharging C3. Then, afterward, when Vs ascends and crosses over the ascending reference, the voltage detecting circuit 391 generates a low level driving signal, thereby turning off the transistor 393 and charging up C3. Thus, the power supply 1 softly starts, as shown in FIG. 3: the second engine start this is similar to the first engine start after the ignition switch is turned on.

According to Embodiment 1, the rush current is prevented, not only just after the ignition switch is turned on, but also after the second engine start, as shown in FIG. 3. This is because, even if Vs descends and crosses down the descending reference, the soft start is surely executed again when Vs again ascends and crosses over the ascending reference.

Further, according to Embodiment 1, the charge pump 35 is relatively small-scaled, thereby making the power supply 1 compact-sized.

Further, the transistor 393 in Embodiment 1 for discharging the condenser C3 of the soft start circuit 37 may be replaced by an FET or relay.

Figure 4:
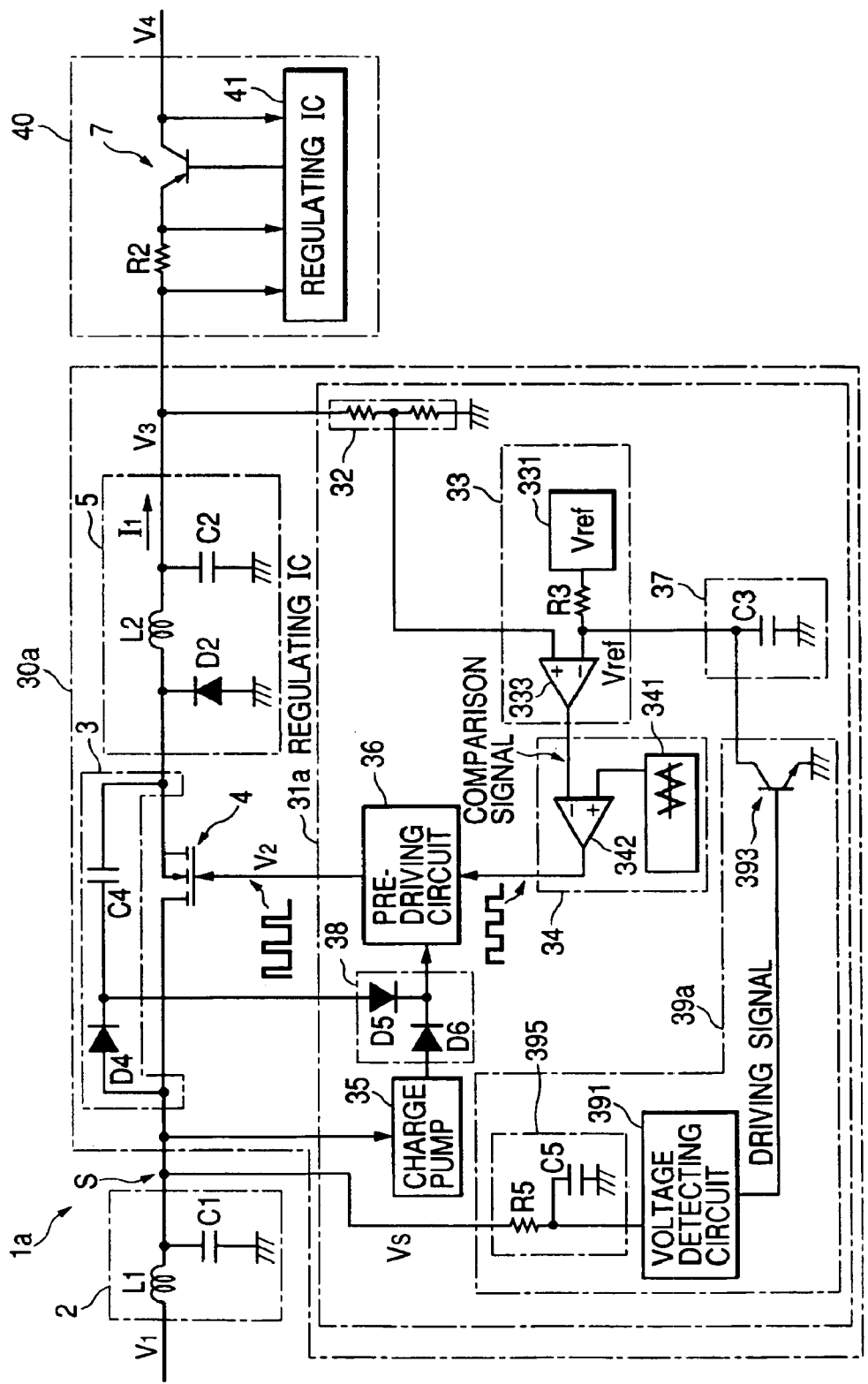
FIG. 4 is a circuit diagram of the power supply as modified on the basis of Embodiment 1.

FIG. 4 is a modified Embodiment 1, wherein Vs is taken in, through a well-known low pass filter 395 (comprising a resistor R5 and condenser C5) in the function recovering circuit 39a, into the voltage detecting circuit 391.

According to modified Embodiment 1, the soft start is not unnecessarily executed, even when a spike noise causes an abrupt voltage drop in Vs.

Embodiment 2

Figure 5:
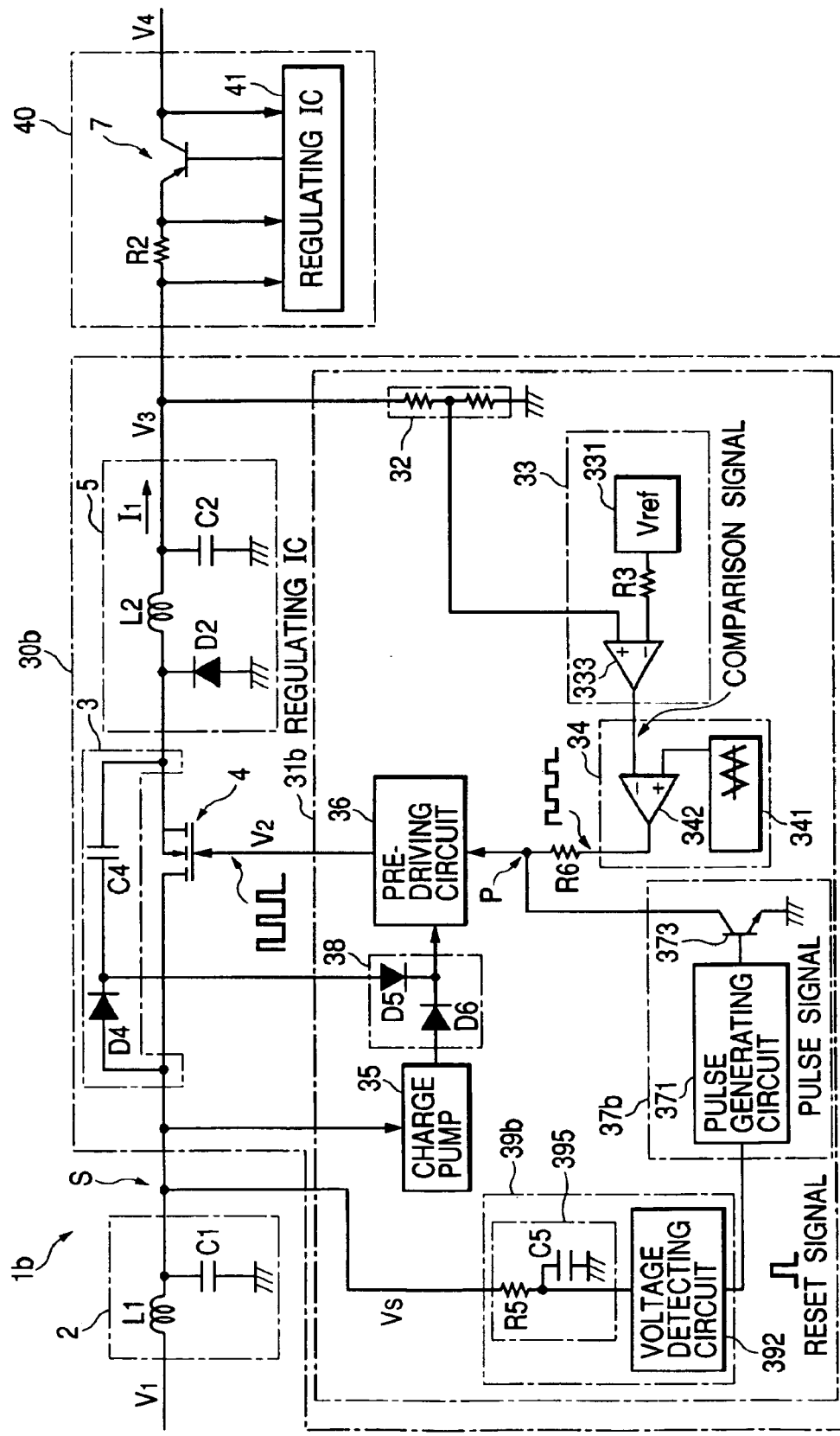
FIG. 5 is a circuit diagram of the power supply of Embodiment 2 of the present invention.

FIG. 5 is a circuit diagram of the power supply 1b of Embodiment 2 which is different from Embodiment 1, only in that a regulating IC 31b comprises: a new soft start circuit 37b and new function recovering circuit 39b. The similar reference numerals are given to the similar elements in Embodiment 2 and 1 (FIGS. 5 and 1).

As shown in FIG. 5, the regulating IC 31b comprises a new soft start circuit 37b and new function recovering circuit 39b, as well as the same elements as Embodiment 1 such as the voltage dividing circuit 32; comparison signal generating circuit 33; PWM circuit 34; charge pump 35; pre-driving circuit 36; and supply voltage selecting circuit 38.

The new soft start circuit 37b comprises: a pulse generating circuit 371 for generating a pulse train during a prescribed time period after turning on the power supply 1b; and a transistor 373 which is turned on and off in accordance with the pulse train. The collector of the transistor 373 is connected with the signal line at a point P between the PWM circuit 34 and pre-driving circuit 36.

Here, a resistance R6 is connected between the point P and the output terminal of the operational amplifier 342, thereby limiting an electric current throug that signal line.

Further, the pulse generating circuit 371 (including a counter circuit) starts and stops the pulse train during a prescribed time period (suppress period) which is longer than a period during which the input voltage $V_1$ is stabilized. The pulse generating circuit 371 starts and stops again the pulse train, when a reset signal is inputted from the new function recovering circuit 39b.

Further, the new function recovering circuit 39b comprises: the low pass filter 395 which takes in Vs and removes a spike noise from Vs; and a voltage detection circuit 392 for generating, on the basis of the noise-removed Vs, the above-mentioned reset signal for resetting the pulse generating circuit 371.

Further, the voltage detecting circuit 392 determines, similarly to the voltage detecting circuit 391, whether or not Vs ascended and crossed over the ascending reference, and moreover whether or not Vs descended and crossed down the descending reference. Further, the reset signal level generated by the voltage detecting circuit 392 is made low level, not only during a period from the startup of the power supply 1b until the cross-over of the ascending reference, but also during another period from the cross-down of the descending reference until the recovery of the ascending reference, as shown in FIG. 6.

Figure 6:
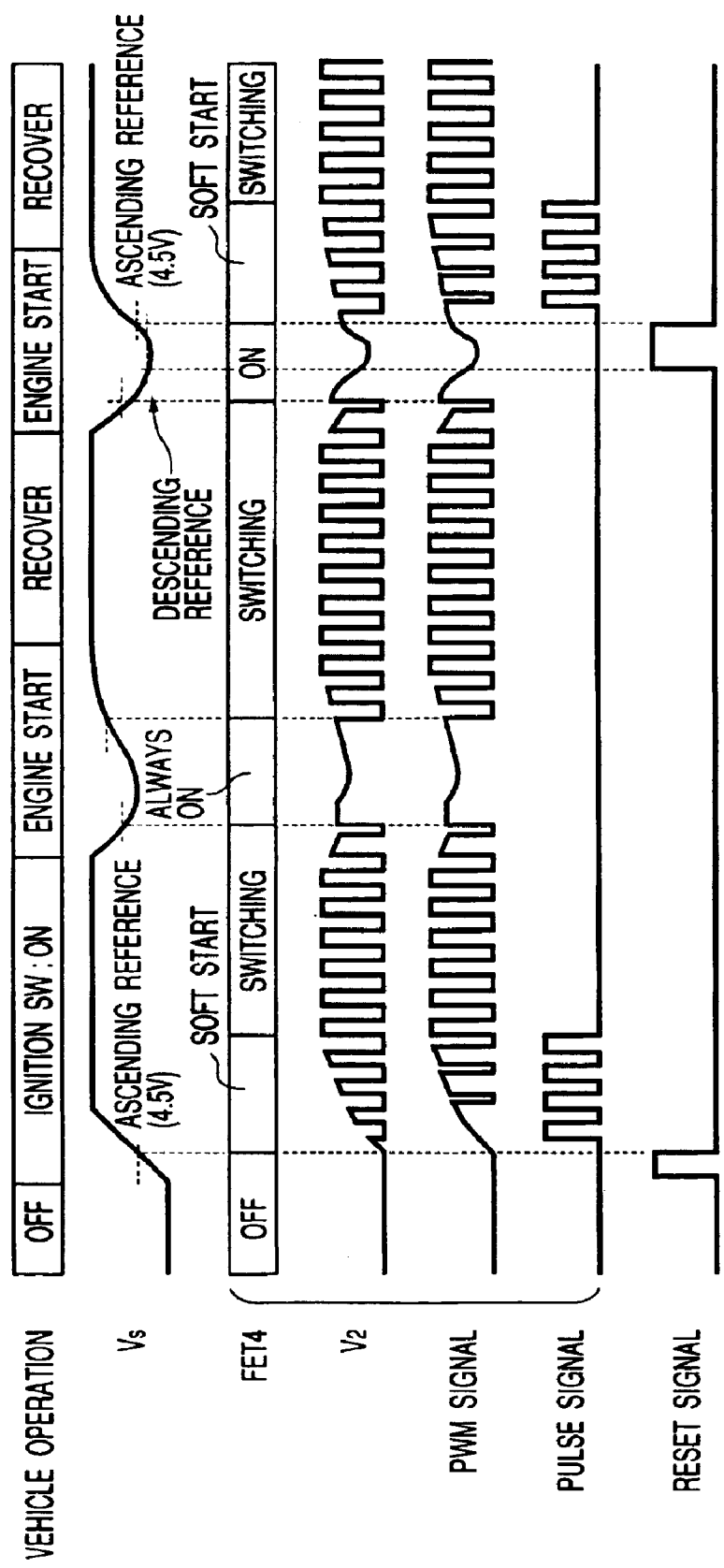
FIG. 6 is a timing chart of voltages and an electric current at various points in the power supply circuit of Embodiment 2.

Therefore, as shown in FIG. 6, not only when the ignition switch SW of the vehicle is turned on and the power supply 1b is electrically connected with the external power supply G (as shown in FIG. 2), but also when the voltage detecting circuit 392 detects that Vs reaches the ascending reference, the high level reset signal is changed into a low level reset signal by the voltage detecting circuit 392, thereby starting up the pulse generating circuit 371.

Thus, the pulse train is outputted during the prescribed time period (suppress period), thereby turning on and off the transistor 373 during that suppress period.

During the suppress period, the duty ratio of the PWM signal generated by the PWM circuit 34 is increased very much, because $V_3$ is small. However, the wave form on the signal line between the operational amplifier 342 and pre-driving circuit 36 is decided by a logical product of the PWM signal outputted from the operational amplifier 342 and inverted pulse train outputted from the pulse generating circuit 371, because the collector level of the transistor 373 is made low during turning-on period of the transistor 373. Therefore, the duty ratio of the signal inputted through that signal line is suppressed.

Here, the duty ratio of the inverted pulse train is preferably smaller than 50%, because it must at least be smaller the duty when the FET 4 is made always on by the pre-driving circuit 36.

Then, after the suppress period, the pulse generating circuit 371 is stopped and the PWM signal as it is generated by the PWM signal 34 is supplied to the pre-driving circuit 36, thereby constantly turning on and off FET 4.

Then, afterward, if Vs is lowered due to an engine start or other causes, the PWM circuit 34 supply the pre-driving circuit 36 with the PWM signal having a greater duty ratio, thereby keeping $V_3$ constant. If the duty ratio becomes greater than a reference duty ratio, the pre-driving circuit 36 fixes the duty ratio of its output $V_2$ to be 100%, thereby always turning on FET 4.

At this time, if Vs does not cross down the descending reference, Vs ascends. Then, when the duty ratio becomes smaller than the reference duty ratio, the pre-driving circuit 36 relieves the FET 4 from the always-on state, as shown in FIG. 6: the first engine start.

On the other hand, if Vs crosses down the descending reference, the voltage detecting circuit 392 generates a high level reset signal, thereby resetting the pulse generating circuit 371. Then, afterward, when Vs again ascends and crosses over the ascending reference, the voltage detecting circuit 392 generates a low level reset signal, thereby starting the pulse generating circuit 371. Thus, the power supply 1b softly starts, as shown in FIG. 6: the second engine start. This is similar to the first engine start after the ignition switch is turned on.

According to Embodiment 2, the rush current can be prevented, not only just after the ignition switch is turned on, but also after the second engine star, as shown in FIG. 6. This is because, even if Vs descends and crosses down the descending reference, the soft start is surely executed again when Vs ascends and crosses over the ascending reference.

Further, according to Embodiment 2, an unnecessary soft start due to an abrupt voltage drop caused by a spike noise can be prevented by the new function recovering circuit 39b. This is because Vs is taken in through the low pass filter 395.

While the preferred embodiment has been explained, it is to be understood that various modifications may be made within the scope of the present invention.

Although in the preferred embodiment an electric power was supplied, through the current route between the input filter 2 and FET 4, both to the charge pump 35 and boot strap circuit 3, a current route for supplying the electric power may be provided, between the external voltage supply G and the charge pump 35, between the external voltage source G and boot strap circuit 3. Further, the charge pump 35 and boot strap circuit 3 may be fed through independent current routes by other external voltage source if any.

Further, although in the preferred embodiment the voltage detecting circuits 391 and 392 took in Vs from the output terminal of the input filter 2, they may take in Vs at any suitable prescribed point on the current route, e.g., from the input terminal of the input filter 2 or the output terminal of the switching regulators 30, 30a or 30b.

Particularly, when the output terminal of the switching regulators 30, 30a or 30b (or the input terminal of the series regulator 40) is used for the prescribed point S, the soft start is not unnecessarily executed, because a voltage drop may not possibly be caused even if a voltage drop is caused in a source of an electric power.

Further, although in the preferred embodiment the triangular wave was generated by the PWM circuit 341, a sawtooth wave or sinusoidal wave may be generated.

Further, although in the preferred embodiment the present invention was applied to a vehicle-mounted power supply, it may be applied to a power supply for such mobile objects as an air plane and ship or for other non-mobile objects.

Further, although in the preferred embodiment only one series regulator 40 (as a secondary regulator) was connected with the switching regulator 30, the secondary regulator may be omitted.

Alternatively, another switching regulator may be employed as the secondary regulator. Further, a plurality of the secondary regulators connected with each other in series or parallel may be employed. Further, the descending reference may be is fixed higher than a lowest voltage at which either of the switching regulator or secondary regulators is tuned off.

Further, although in the preferred embodiment there were provided, in the regulating ICs 31, 31a and 31b, the condenser C3 and resistance R3 for determining the period of executing the soft start (suppress period), the voltage dividing circuit 32 for determining the signal level of the comparison signal and elements for determining the ascending and descending reference, those elements may be provided physically outside the regulating ICs by connecting themselves from outside the regulating ICs.

Further, although in the preferred embodiment the regulating ICs 31, 31a and 31b for the switching regulator 30 were independent upon the regulating IC 41 for the series regulator 40, a single IC regulator may be employed both for the switching and series regulators.

Further, the switching regulator of the present invention may be manufactured as a one-chip semiconductor circuit includes all means except said first to third means and switching means, where first determining means is for determining said prescribed time period, second determining means is for determining said ascending reference and third determining means is for determining sad descending reference.

What is claimed is:

1. A switching regulator for supplying an electrical load with a constant voltage which comprises:
   switching means inserted into a current route between an external voltage source and said electric load;
   smoothing means for smoothing an output from said switching means;
   control signal generating means for generating a PWM signal for switching said switching means, in such a manner that an output from said smoothing means are kept constant;
   rush current preventing means, in order to prevent a rush current from flowing in said current route, for generating a suppress control signal for suppressing a duty of said PWM signal within a prescribed duty during a prescribed time period, if a prescribed point voltage at a prescribed point on said current route after said switching regulator was turned on ascends and crosses over a prescribed ascending reference which is fixed lower than said prescribed point voltage; and
   recovering means for operating again said rush current preventing means even after once completing its operation, if said prescribed point voltage descends and crosses down a prescribed descending reference which is fixed lower than said prescribed ascending reference.

2. The switching regulator according to claim 1, wherein:
   said control signal generating means includes: reference voltage generating means for generating a prescribed reference voltage if said prescribed point voltage is higher than said ascending reference; and comparison signal generating means for generating a comparison signal of which amplitude is proportional to a difference between said prescribed reference voltage and a fraction of a smoothed voltage outputted from said smoothing means, wherein said control signal generating means generates said PWM signal of which duty is determined by a signal level of said comparison signal; and
   said rush current preventing means suppresses a duty of said PWM signal by allowing said comparison signal generating means to generate said comparison signal of which signal level is changed in such a manner that said duty increases with the lapse of time.

3. The switching regulator according to claim 2, wherein:
   said rush current preventing means is a condenser which is charged from a discharged voltage up to said prescribed reference voltage during said prescribed time period and which supplies, in place of said prescribed reference voltage, said comparison signal generating means with a voltage of said condenser during being charged; and
   said recovering means operates again said rush current preventing means by discharging said condenser.

4. The switching regulator according to claim 1, wherein said rush current preventing means comprises: pulse generating means for generating a pulse train during said prescribed time period; and suppress control signal generating means for generating said suppress control signal on the basis of said pulse train; and
   said recovering means operates again said rush current preventing means by resetting said pulse generating means.

5. The switching regulator according to claim 4, wherein:
   said suppress control signal generating means includes off-driving means for changing a signal level of said PWM signal into a level which turns off said switching means; and
   said suppress control signal generating means generates, on the basis of an operation of said off-driving means, said suppress control signal in which a component of a level which turns on said switching means is suppressed.

6. The switching regulator according to claim 1, wherein said recovering means detects said prescribed point voltage through a low pass filter connected with said external voltage source.

7. The switching regulator according to claim 1, wherein said prescribed point voltage is a voltage outputted from said external voltage source.

8. The switching regulator according to claim 1, wherein said prescribed point voltage is a voltage outputted from said smoothing means.

9. The switching regulator according to claim 1, which further comprises other regulator connected between said smoothing means and electric load,
   wherein said prescribed point voltage is a voltage outputted from said other regulator.

10. The switching regulator according to claim 1, which further comprises first determining means for determining said prescribed time period, second determining means for determining said ascending reference and third determining means for determining sad descending reference,
    wherein a one-chip semiconductor circuit includes all means except said first to third means and switching means.

11. A power source for supplying an electrical load with a constant voltage which comprises:
    a switching regulator comprising,
       switching means inserted into a current route between an external voltage source and said electric load,
       smoothing means for smoothing an output from said switching means,
       control signal generating means for generating a PWM signal for switching said switching means, in such a manner that an output from said smoothing means are kept constant,
       rush current preventing means for preventing a rush current on said current route by suppressing a duty of said PWM signal within a prescribed duty during a prescribed time period, if a prescribed point voltage at a prescribed point on said current route after said voltage source is turned on ascends and crosses over a prescribed ascending reference,
       recovering means for operating again said rush current preventing means even after once completing its operation, if said prescribed point voltage descends and crosses down a prescribed descending reference which is fixed lower than said prescribed ascending reference; and
    one or more secondary regulators connected between said smoothing means and electric load for regulating an output from said smoothing means.

12. The power source according to claim 11, wherein said descending reference is fixed higher than a lowest voltage at which either of said switching regulator, or said secondary regulators is tuned off.

13. The power source according to claim 11, wherein said power source is mounted on a vehicle.

* * * * *